US007945006B2

(12) United States Patent
Chen et al.

(10) Patent No.: US 7,945,006 B2
(45) Date of Patent: May 17, 2011

(54) DATA-DRIVEN METHOD AND APPARATUS FOR REAL-TIME MIXING OF MULTICHANNEL SIGNALS IN A MEDIA SERVER

(75) Inventors: Jingdong Chen, North Plainfield, NJ (US); Yiteng Arden Huang, North Plainfield, NJ (US); Thomas Y Woo, Red Bank, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1879 days.

(21) Appl. No.: 10/875,553

(22) Filed: Jun. 24, 2004

(65) Prior Publication Data
US 2005/0286664 A1    Dec. 29, 2005

(51) Int. Cl.
*H04B 1/10* (2006.01)
(52) U.S. Cl. ....... 375/349; 375/227; 370/263; 370/265; 370/266; 370/268; 370/270
(58) Field of Classification Search ................. 375/349, 375/227, 346; 370/493, 494, 395.53, 395.52, 370/263, 265, 266, 268–270, 495, 271; 381/59
See application file for complete search history.

(56) References Cited

U.S. PATENT DOCUMENTS

| | | | | |
|---|---|---|---|---|
| 4,628,529 A * | 12/1986 | Borth et al. | ................... | 381/94.3 |
| 6,122,384 A * | 9/2000 | Mauro | ......................... | 381/94.3 |
| 6,898,566 B1 * | 5/2005 | Benyassine et al. | .......... | 704/226 |
| 2002/0116182 A1 * | 8/2002 | Gao et al. | ....................... | 704/205 |
| 2002/0123895 A1 * | 9/2002 | Potekhin et al. | .............. | 704/275 |
| 2002/0143532 A1 * | 10/2002 | McLean et al. | ................ | 704/235 |
| 2003/0063574 A1 * | 4/2003 | Virolainen | ..................... | 370/260 |
| 2003/0101120 A1 * | 5/2003 | Tilton | ............................. | 705/36 |
| 2004/0076271 A1 * | 4/2004 | Koistinen et al. | ........... | 379/88.11 |
| 2004/0101120 A1 * | 5/2004 | O'Malley et al. | ......... | 379/202.01 |
| 2004/0179092 A1 * | 9/2004 | LaPoint | ....................... | 348/14.08 |
| 2004/0249634 A1 * | 12/2004 | Degani et al. | .................. | 704/207 |
| 2004/0254488 A1 * | 12/2004 | Nelson et al. | ................. | 600/528 |
| 2005/0071156 A1 * | 3/2005 | Xu et al. | ........................ | 704/226 |

OTHER PUBLICATIONS

Christopher J. Zarowski, "Limitations on SNR Estimator Accuracy", *IEEE Transactions on Signal Processing*, vol. 50, No. 9, (Sep. 2002), pp. 2368-2372.
Walter Etter, et al, "Noise Reduction by Noise-Adaptive Spectral Magnitude Expansion", *J. Audio Eng. Soc.*, vol. 42, No. 5, (May 1994), pp. 341-349.

(Continued)

*Primary Examiner* — David C. Payne
*Assistant Examiner* — Rahel Guarino
(74) *Attorney, Agent, or Firm* — Kenneth M. Brown

(57) ABSTRACT

An apparatus for mixing audio signals in a voice-over-IP teleconferencing environment comprises a preprocessor, a mixing controller, and a mixing processor. The preprocessor is divided into a media parameter estimator and a media preprocessor. The media parameter estimator estimates signal parameters such as signal-to-noise ratios, energy levels, and voice activity (i.e., the presence or absence of voice in the signal), which are used to control how different channels are mixed. The media preprocessor employs signal processing algorithms such as silence suppression, automatic gain control, and noise reduction, so that the quality of the incoming voice streams is optimized. Based on a function of the estimated signal parameters, the mixing controller specifies a particular mixing strategy and the mixing processor mixes the preprocessed voice streams according the strategy provided by the controller.

26 Claims, 4 Drawing Sheets

OTHER PUBLICATIONS

R. Even, et al, "draft-even-sipping-media-policy-requirements", *Polycom, RADVISION, Cisco Systems, Inc.*, (Feb. 23, 2003), 16 Pages.

J. Chen, et al, "Sub-Band Based Additive Noise Removal for Robust Speech Recognition" *Proc. of European Conference on Speech Communication and Technology*, vol. 1, (Jul. 2001), pp. 571-574.

P. Venkat Rangan, et al, "Communication Architectures and Algorithms for Media Mixing in Multimedia Conferences", *IEEE/ACM Transactions on Networking*, vol. 1, No. 1, (Feb. 1993), pp. 20-30.

Paxton J. Smith, et al, "Tandem-Free VoIP Conferencing: A Bridge to Next-Generation Networks", *IEEE Communications Magazine*, vol. 41, (May 2003), pp. 136-145.

Jurgen Tchorz, et al, "SNR Estimation Based on Amplitude Modulation Analysis With Applications to Noise Suppression", *IEEE Transactions on Speech and Audio Processing*, vol. 11, No. 3, (May 2003) pp. 184-192.

Eric J. Diethorn, "A Subband Noise-Reduction Method for Enhancing Speech in Telephony & Teleconferencing", *1997 IEEE Workshop on Applications of Signal Processing to Audio and Acoustics*, Mohonk Mountain House, New Paltz, NY (Oct. 22, 1997), 4 pages.

Naveen Sastry, et al, "Secure Verification of Location Claims", *RSA Laboratories Cryptobytes*, vol. 7, No. 1, (Spring 2004), pp. 16-28.

\* cited by examiner

DATA-DRIVEN METHOD AND APPARATUS FOR REAL-TIME MIXING OF MULTICHANNEL SIGNALS IN A MEDIA SERVER

FIELD OF THE INVENTION

The present invention relates generally to the mixing of audio signals as employed, for example, in a voice-over-IP (Internet Protocol) teleconferencing environment, and more particularly to a data-driven method and apparatus for mixing audio signals in a voice-over-IP environment based on certain key characteristics of the incoming signals.

BACKGROUND OF THE INVENTION

Conferencing capability is an essential part of any voice communication network. Wide-area conferencing facilitates group collaborations, such as between businesses, educational institutions, government organizations, the military, etc. Typical traditional conferencing techniques often rely on time division multiplexing (TDM) techniques to bridge and mix voice traffic streams. (TDM-based systems are fully conventional and well known to those of ordinary skill in the art.)

Recently, a great deal of effort has gone into Internet-based voice communication systems (commonly referred to as voice-over-IP systems) and in particular to the development of Internet Protocol (IP) based media severs, which can offer advanced and cost-effective conferencing services in such voice-over-IP environments. One of the key portions of an voice-over-IP based conferencing media sever is the audio signal mixer whose functionality is to mix a plurality of inbound voice streams from multiple users and then send back to each user a mixed voice stream, thereby enabling each user to hear the voices of the other users.

Traditionally, such audio signal mixing has been accomplished through the use of a straightforward mixing algorithm which merely combines (i.e., sums) all of the plural voice traffic streams together and then normalizes the aggregate signal to an appropriate range (in order to prevent it from clipping). This method has been widely adopted in the currently available conferencing systems because of its computational efficiency and implementation simplicity.

However, the voice quality of the mixed streams with such a simplistic method is often not acceptable due to various reasons such as, for example, differing voice levels, unbalanced voice qualities, and unequal signal-to-noise ratios (SNR) among different channels. In addition, when too many channels are mixed together (e.g., when too many users are speaking simultaneously), the listener cannot easily distinguish one particular speaker from the others.

Therefore, to limit the number of channels present at a time in the mixed signal, the functionality of a "loudest N selection" has been added to the above-described straightforward mixing algorithm. In this modified approach, the energy level of each inbound channel is estimated and is then used as a selection criterion. Those channels with energy above a certain threshold, for example, are selected and mixed into the output signal, while all of the other channels are merely discarded (i.e., ignored).

Although this modified method does in fact improve the perceptual quality of the mixed speech signal (by limiting the number of mixed channels), using the signal volumes as the selection criterion does not necessarily provide a high quality solution to the problem. High volume does not necessarily indicate the importance of the channel. For example, the use of this method may block important speakers with low voice volume. In addition, due to the inherent fluctuation of the energy estimation, the presence of a certain channel in the mixed signal may not be continuous and consistent (even though it should be). Thus, in general, the improvement in the quality of the mixed signal over the simple summing technique with use of this method is somewhat limited.

SUMMARY OF THE INVENTION

In accordance with the principles of the present invention, a data-driven mixing method and apparatus for media conferencing servers in advantageously provided whereby the mixing of audio signals is based on certain key characteristics of the incoming signals—in particular, one or more characteristics including an estimate of the signal to noise ratio (SNR) of the incoming signals. In accordance with one illustrative embodiment of the invention, a signal mixer is advantageously divided into three parts—a preprocessor, a mixing controller, and a mixing processor. The preprocessor may then be further divided into a media parameter estimator and a media preprocessor.

In accordance with the illustrative embodiment, the media parameter estimator, as its name indicates, advantageously estimates certain important signal parameters such as, for example, signal-to-noise ratios, energy levels, voice activity (i.e., the presence or absence of voice in the signal), etc., which may be advantageously used to control how different channels are mixed. The media preprocessor advantageously employs certain algorithms such as, for example, silence suppression, automatic gain control, and noise reduction, in order to process or filter the inbound voice streams so that the voice quality is advantageously optimized.

Given the preprocessed media streams and estimated signal parameters, the mixing controller of the illustrative embodiment then advantageously specifies a particular strategy to mix the inbound streams. Finally, the mixing processor mixes the inbound streams according the strategy provided by the controller.

DETAILED DESCRIPTION

I. A Straightforward Prior Art Mixing System

Figure 1:
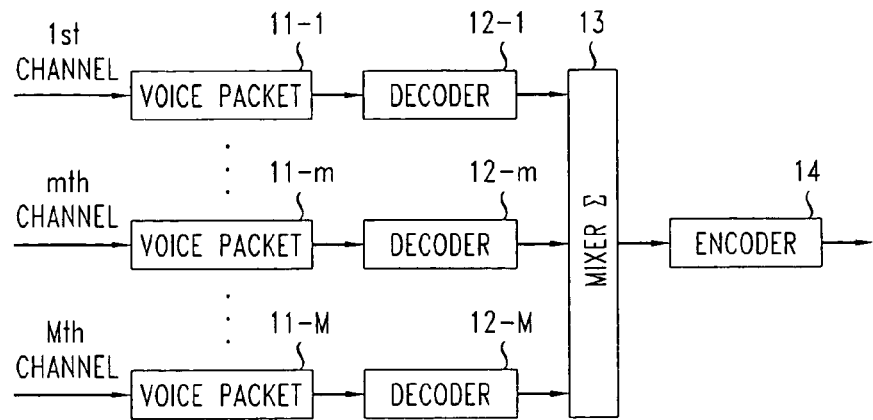
FIG. 1 shows a first prior art system for mixing audio signals in a voice-over-IP environment in which all incoming signals are merely combined.

FIG. 1 shows a first prior art system for mixing audio signals in a voice-over-IP environment in which all incoming signals are merely combined. In particular, the prior art mixing system comprises voice packet receivers 11-1 through 11-M for receiving voice packets for each of the corresponding channels; decoders 12-1 through 12-M for decoding the corresponding received voice packets and producing corresponding audio signals therefrom; signal mixer 13 which combines (i.e., sums) the M audio signals and preferably normalizes the resultant sum to avoid clipping problems; and encoder 14 for encoding the resultant (i.e., mixed) audio signal back into voice packet form (i.e., for retransmission back to another channel).

[Note that, since it is invariably preferred that a user participating in a teleconference receives back a mixing of audio channels which excludes his or her own, it will be assumed herein and throughout that for each channel m, a combination of channels 1 through M which excludes channel m is produced by the given audio signal mixer. In other words, each mixer shown is actually to be considered an (M−1)-channel mixer.]

Expressed mathematically, given that there are a total of M inbound channels (e.g., M speakers) denoted by $x_m(n)$, m=1, 2,Λ,M, (i.e., $x_m(n)$ represents the decoded signal from the m'th channel), the outbound signal to be sent back to the m'th channel in the straightforward mixing algorithm of FIG. 1 can be expressed as:

$$y_m(n) = \frac{1}{\eta_m} \sum_{\substack{i=1 \\ i \neq m}}^{M} x_i(n), \tag{1}$$

where $\eta_m$ is a normalization factor so that the resultant (i.e., mixed) signal will not saturate. Commonly, $\eta_m$ is selected as either $\eta_m$=M−1, or as $\eta_m$=$\sqrt{M-1}$. In the former case, the maximum amplitude of the mixed outgoing signal will be less than or equal to the largest amplitude of the M−1 inbound signals, while in latter case, the power of the mixed signal is equal to the average power of the M−1 inbound channels.

II. A Prior Art Mixing System with Loudness-Based Selection

Figure 2:
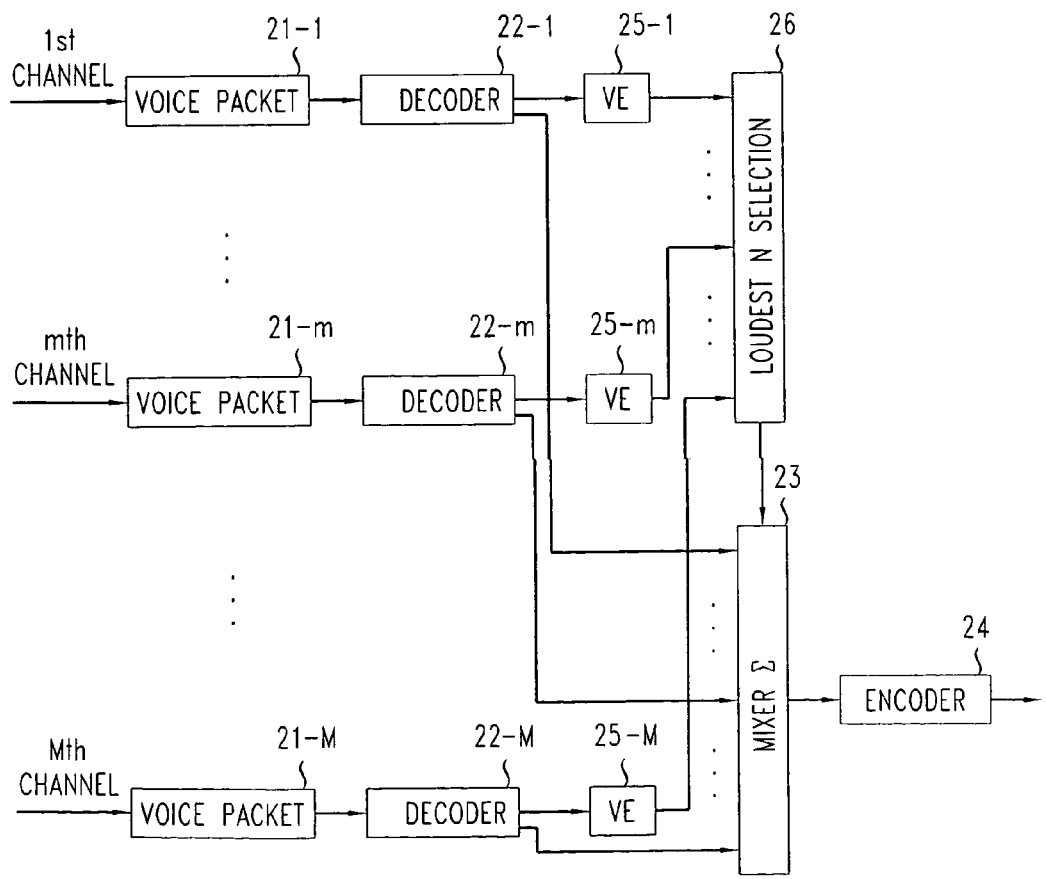
FIG. 2 shows a second prior art system for mixing audio signals in a voice-over-IP environment which employs a "loudest N selection" mechanism.

As explained above, there are certain limitations inherent to the straightforward prior art signal mixer of FIG. 1. One of them is that as the number of inbound channels increases— i.e., as more channels are mixed together—the intelligibility, or more generally, the quality of the mixed signal, degrades quickly. One approach taken by prior art mixing systems is to limit the number of channels to be mixed, in particular to the "loudest N" channels. FIG. 2 shows such a second prior art system for mixing audio signals in a voice-over-IP environment which employs a "loudest N selection" mechanism.

In particular, and as in the prior art mixing system shown in FIG. 1, the prior art mixing system of FIG. 2 similarly comprises voice packet receivers 21-1 through 21-M for receiving voice packets for each of the corresponding channels; decoders 22-1 through 22-M for decoding the corresponding received voice packets and producing corresponding audio signals therefrom; and encoder 24 for encoding the resultant (i.e., mixed) audio signal back into voice packet form (i.e., for retransmission back to another channel).

However, the prior art mixing system of FIG. 2 also employs volume estimators (VE) 25-1 through 25-M which advantageously estimate the signal energy of each incoming channel, and (loudest N) selector 26 which sorts these M volume estimates and then advantageously selects the N channels from the total of M channels for which the estimated energies are largest. Then, signal mixer 23 combines (i.e., sums) the audio signals from the N selected channels and preferably normalizes the resultant sum as in the case of the prior art signal mixer of FIG. 1.

Expressed mathematically, if $\epsilon_N$ denotes the set of the indexes of the N loudest channels, the mixing algorithm can be expressed as:

$$y_m(n) = \frac{1}{\eta_m} \sum_{\substack{i \in \epsilon_N \\ i \neq m}} x_i(n) \tag{2}$$

where $y_m(n)$ is the mixed signal that is to be sent back to the m'th user (see discussion above), and $\eta_m$ is a normalization factor which may be set similarly to that of the prior art mixing system of FIG. 1 (i.e., as either $\eta_m$=N−1, or, as $\eta_m$=$\sqrt{N-1}$.

III. A Data-Driven Mixing System According to One Embodiment of the Invention

Figure 3:
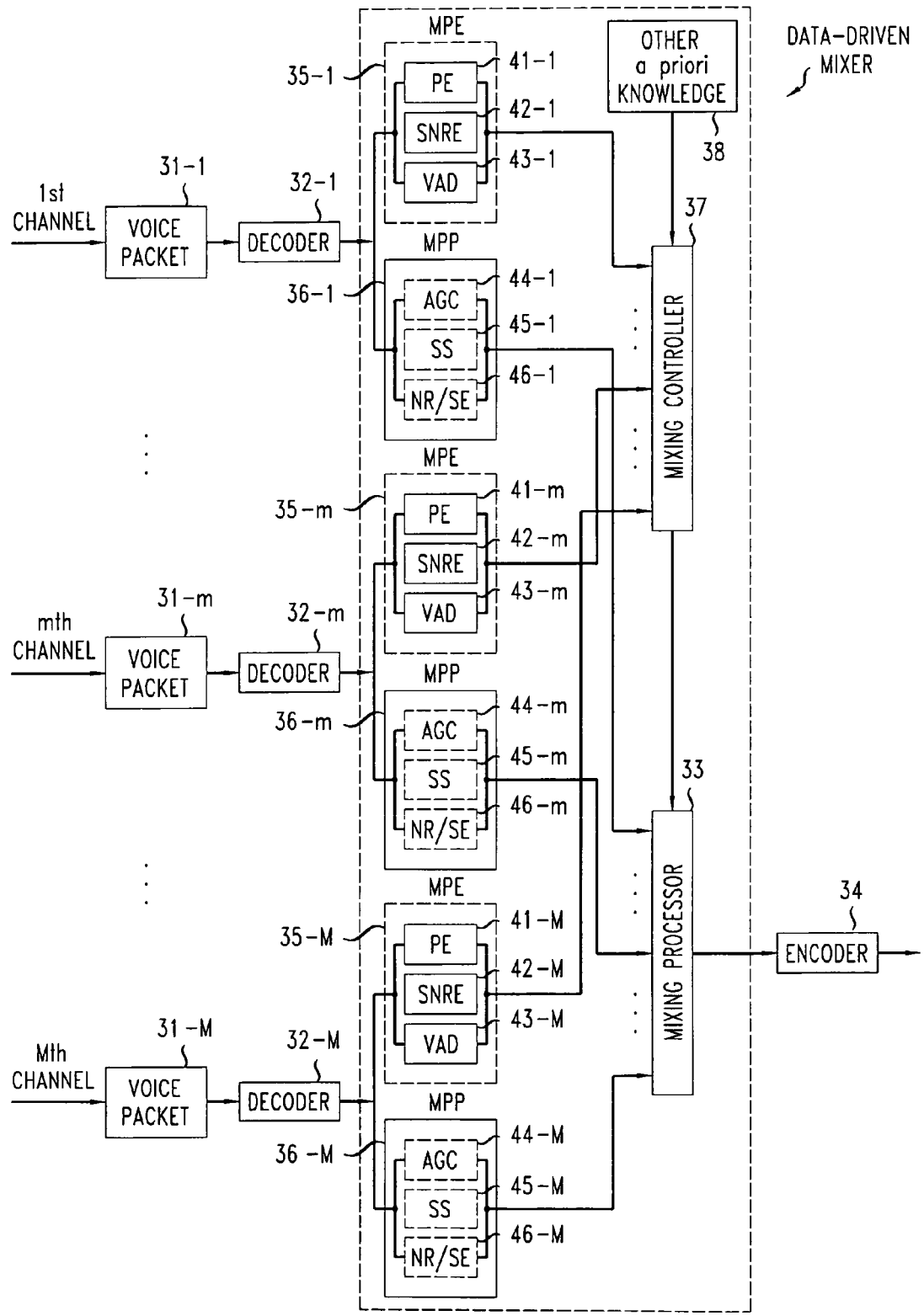
FIG. 3 shows a data-driven mixing system for mixing audio signals in a voice-over-IP environment in accordance with an illustrative embodiment of the present invention.

FIG. 3 shows a data-driven mixing system for mixing audio signals in a voice-over-IP environment in accordance with an illustrative embodiment of the present invention. In particular, as in the prior art mixing systems shown in FIGS. 1 and 2, the novel illustrative mixing system of FIG. 3 similarly comprises voice packet receivers 31-1 through 31-M for receiving voice packets for each of the corresponding channels; decoders 32-1 through 32-M for decoding the corresponding received voice packets and producing corresponding audio signals therefrom; and encoder 34 for encoding the resultant (i.e., mixed) audio signal back into voice packet form (i.e., for retransmission back to another channel).

However, unlike the prior art mixing systems shown in FIGS. 1 and 2, the novel illustrative mixing system of FIG. 3 also comprises media parameter estimators (MPEs) 35-1 through 35-M; media preprocessors (MPPs) 36-1 through 36-M; mixing controller 37; and mixing processor 33. Moreover, each media parameter estimator 35-*m* advantageously further comprises corresponding power estimator (PE) 41-*m*; corresponding signal-to-noise ratio estimator (SNRE) 42-*m*; and corresponding voice activity detector (VAD) 43-*m*. In addition, each media preprocessor 36-*m* advantageously further comprises corresponding automatic gain control (AGC) 44-*m*; corresponding silence suppression module (SS) 45-*m*; and corresponding noise reduction and speech enhancement module (NR/SE) 46-*m*.

In operation, the media parameter estimators advantageously acquire certain important signal parameters that are subsequently used to control how different channels are mixed, while the media preprocessors advantageously use select advanced digital signal processing techniques to transform (i.e., filter) the incoming signals to enhance their quality prior to mixing. The functionality of the mixing controller is to specify a concrete mixing algorithm (in accordance with the specific illustrative embodiment of the present invention) from the estimated signal parameters, and, in accordance with certain of the illustrative embodiments of the present invention, also from certain available a priori knowledge 38. Finally, the mixing processor will accomplish the actual signal mixing task by mixing the signals generated by the plurality of media preprocessors according to the concrete mixing algorithm specified by the mixing controller, and will thereby generate the outgoing (i.e., mixed) signal.

More particularly, the following provides more details of the operation of the components of the data-driven mixing system for mixing audio signals in a voice-over-IP environment in accordance with the illustrative embodiment of the present invention as shown in FIG. 3:

The power estimator (PE) advantageously estimates the instantaneous and the long-term average energy of each incoming channel. If the incoming signal at time instant n for the m'th channel and the k'th packet is denoted by $x_{m,k}(n)$, then the instantaneous energy can be advantageously obtained as:

$$E_m(k) = \frac{1}{Q}\sum_{n=1}^{Q} x^2_{m,k}(n) \qquad (3)$$

where Q is the number of samples in the voice packet. The long-term average energy can then be advantageously estimated by low-passing the instantaneous energy, as follows:

$$E_m = LP[E_m(k)] \qquad (4)$$

where LP denotes a conventional low-pass filter. Power estimation as described herein is conventional and will be fully familiar to those of ordinary skill in the art.

The signal-to-noise ratio estimator (SNRE) advantageously estimates the short-term and the long-term signal-to-noise ratio (SNR) of each incoming channel. In order to achieve these estimates, noise-only packets are advantageously distinguished from speech (i.e., speech-plus-noise) packets and their energy is advantageously calculated separately.

Signal-to-noise ratio estimation as described herein is conventional and will be fully familiar to those of ordinary skill in the art. For example, such signal-to-noise ratio estimation techniques are described in "Sub-band Based Additive Noise Removal for Robust Speech Recognition" by J. Chen et al., Proc. European Conference on Speech Communication and Technology, vol. 1, pp. 571-574, 2001, and also in "An Efficient Algorithm to Estimate the Instantaneous SNR of Speech Signals" by R. Martin, Proc. European Conference on Speech Communication and Technology, 1993, pp. 1093-1096, 1993. Both of these documents are hereby incorporated by reference as if fully set forth herein.

Figure 4:
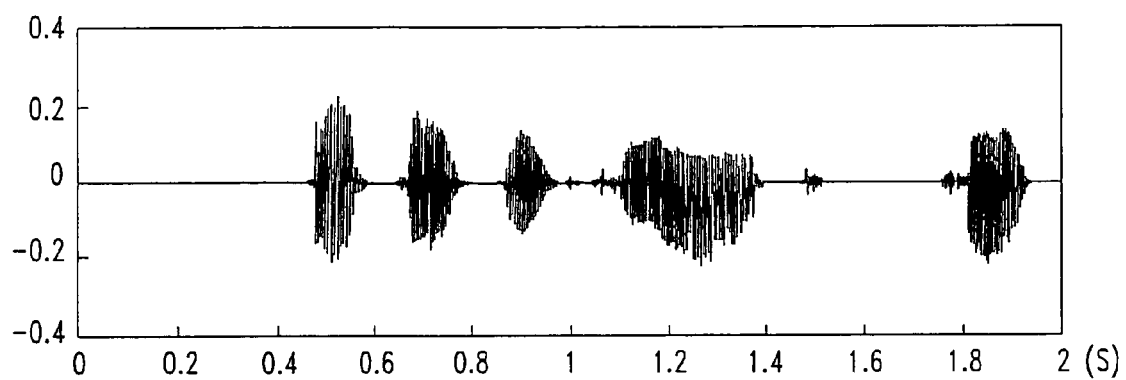
FIG. 4 shows an illustrative waveform of a typical sample voice signal.

The voice activity detector (VAD): FIG. 4 shows an illustrative waveform of a typical sample voice signal. As can be seen in the figure, a typical speech signal does not always comprise speech—for a large portion of the time, it is only noise (i.e., silence). The VAD module advantageously determines the presence or absence of speech. The output of this modular may simply be a binary value. For example, if the current voice packet consists of actual speech, the output may be set to one. On the other hand, if the current voice packet contains no speech, but only noise, the output may be set to zero. Voice activity detection as described herein is conventional and will be fully familiar to those of ordinary skill in the art.

Figure 5:
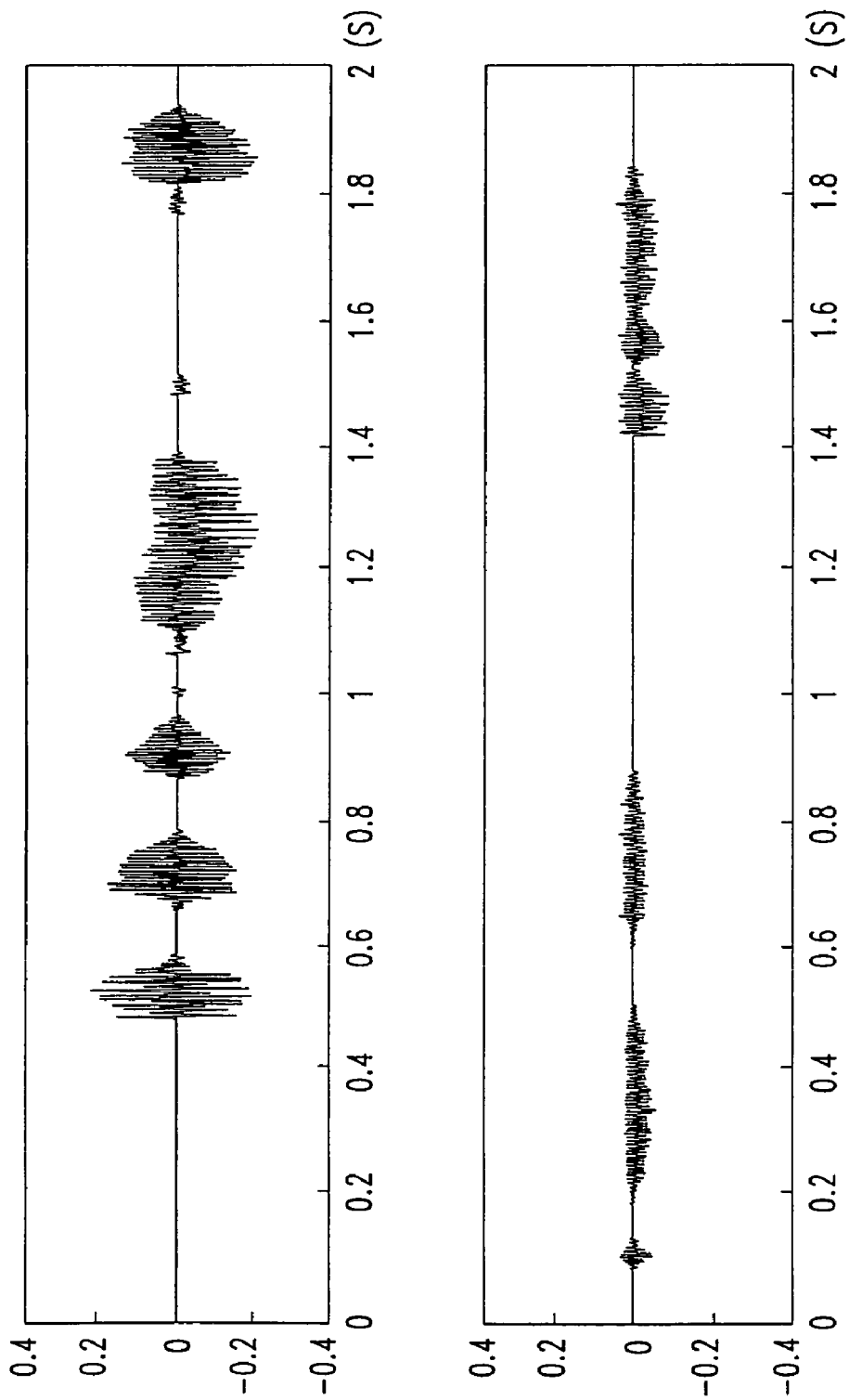
FIG. 5 shows two illustrative waveforms of two sample voice signals having significantly different average channel volume.

Automatic gain control (AGC): In a typical teleconferencing system, each incoming voice stream may be from a different environment, endpoint, and channel, and the average channel volume may vary significantly. (FIG. 5 shows two illustrative waveforms of two sample voice signals having significantly different average channel volume.) As a result, a channel with a relatively low volume may be masked by some channels with relatively high volumes after mixing. To prevent this from happening, the gain of each incoming, voice stream is advantageously adjusted automatically in such a manner that each channel will have a similar voice volume before mixing. Automatic gain control as described herein is conventional and will be fully familiar to those of ordinary skill in the art.

Silence Suppression (SS): As described above, a typical speech signal does not always contain speech—that is, for a fairly large percentage of time, it contains merely noise. When this noise level is high, a mixed signal which includes it may actually be more noisy than the original (incoming) single-channel signals. The silence suppression module advantageously attenuates the noise level during these periods of time where there is an absence of actual speech. Silence suppression as described herein is conventional and will be fully familiar to those of ordinary skill in the art.

Figure 6:
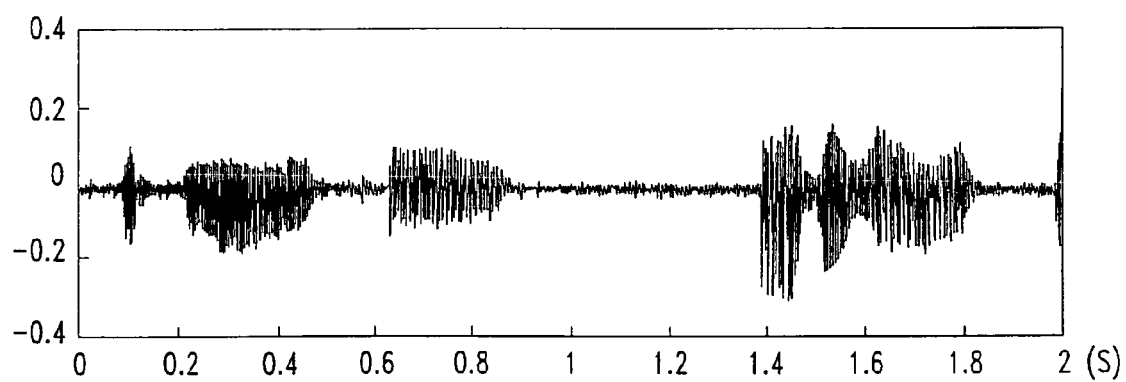
FIG. 6 shows an illustrative waveform of a sample voice signal having a significant amount of noise.

Noise Reduction (NR)/Speech Enhancement (SE): FIG. 6 shows an illustrative waveform of a sample voice signal having a significant amount of noise. In a typical teleconferencing system, when some channels are very noisy such as the one shown in FIG. 6, the noise effect is often fortified by straightforward mixing due to multiple users. Silence suppression as described above provides some noise attenuation, but only during the absence of speech. In order to deliver a superior quality of service, a noise reduction or speech enhancement algorithm is advantageously employed to effectively reduce noise during both the presence and absence of speech, while minimizing speech distortion. This may, for example, be advantageously accomplished by estimating a noise replica signal and then subtracting it from subsequent noisy signals. Such noise reduction and speech enhancement techniques as described herein are conventional and will be fully familiar to those of ordinary skill in the art.

Other a priori Knowledge: In general, there may be certain information available to a system which can be advantageously used to further improve the quality of a mixing system. For example, in some situations, it may be known that a certain speaker (i.e., incoming channel) is a particularly important speaker, and therefore that it would be advantageous to ensure that his or her voice is included in the mixed signal, regardless of whether or not it is has been determined that it should be so included. Alternatively, there may be certain "mixing rules," which may, for example, even be applied on a listener by listener basis, which would be advantageous to follow. For example, a given listener may, for personal reasons, always want to hear the voice (i.e., incoming channel) from a particular user, whether or not he or she is speaking or whether or not his or her channel would have been otherwise included in the mixed signal. Such a priori knowledge as described herein can, in accordance with certain illustrative embodiments of the present invention, be advantageously used to drive the mixing policy.

Mixing Controller: Given the estimated signal parameters and the preprocessed voice streams, the mixing controller of the illustrative embodiment of the present invention as shown in FIG. 3 advantageously "decides" how to mix the multichannel signals to achieve maximum quality. Expressed mathematically, the mixing controller can be seen as providing a transformation of the signal parameters and the a priori knowledge, as follows:

$$C_m(k) = \Gamma\{E_m(k), E_m, SNR_m(k), SNR_{m,\xi}\} \qquad (5)$$

where $E_m(k)$, $E_m$, $SNR_m(k)$, $SNR_{m,\xi}$, and $C_m(k)$ represent the short-term average energy, long-term average energy, short-term SNR, long-term SNR, a set of a priori knowledge, and the controller output at time instant k and for the m'th channel, respectively.

Thus, the "role" of the mixing controller is to determine the transformation $\Gamma\{\cdot\}$. For example, in accordance with the prior art mixing system employing the loudest N selection technique, $\Gamma\{\bullet\}$ can be defined as follows:

$$\Gamma = \begin{cases} 1, & E_m \in \{N \text{ maxima of } \{E_1, E_2, \Lambda, E_M\}\} \\ 0, & \text{otherwise} \end{cases} \quad (6)$$

In other words, in this case, $C_m(k)$ is equal to 1 if $E_m$ is among the N largest energies, otherwise, $C_m(k)$ is equal to 0.

However, in accordance with one illustrative embodiment of the present invention, wherein the N channels having the highest signal-to-noise ratio estimates are mixed together, $\Gamma\{\bullet\}$ is defined as follows:

$$\Gamma = \begin{cases} 1, & SNR_m \in \{N \text{ maxima of } \{SNR_1, SNR_2, \Lambda, SNR_M\}\} \\ 0, & \text{otherwise} \end{cases} \quad (7)$$

In accordance with other illustrative embodiments of the present invention, more sophisticated transformations can be advantageously defined by jointly considering the parameters $E_m(k)$, $E_m$, $SNR_m(k)$, $SNR_m$, and $\varsigma$.

Mixing Processor: Finally, the mixing processor advantageously mixes the preprocessed incoming signals for each outbound channel according to the mixing policy $[C_m(k)]$ given by the controller. The generated (i.e., mixed) signal can then be encoded for transmission back to the corresponding listener.

IV. Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. For example, although the illustrative embodiment described above provides a mixing technique which combines a number of identified features and capabilities into an extremely powerful and flexible mixing system, many other mixing systems (and methods) in accordance with other illustrative embodiments of the present invention will advantageously employ a subset of the above-described features and capabilities and/or will advantageously employ some or all of these features and capabilities in combination with any of a number of additional features and capabilities.

Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

We claim:

1. A method for generating a mixed audio channel signal from a plurality of incoming audio channel signals, the method comprising the steps of:
    determining a corresponding signal-to-noise ratio estimate for each of said plurality of incoming audio channel signals;
    selecting a proper subset of said plurality of incoming audio channel signals based on said corresponding plurality of signal-to-noise ratio estimates; and
    generating the mixed audio channel signal by combining only said selected proper subset of said incoming audio channel signals,
    wherein said proper subset of said plurality of incoming audio channel signals is selected by choosing a plural number of said plurality of incoming audio channel signals having higher signal-to-noise ratio estimates than other ones of said plurality of incoming audio channel signals.

2. The method of claim 1 wherein said incoming audio channel signals comprise voice-over-IP packet-based voice signals.

3. The method of claim 1 wherein said signal-to-noise ratio estimates comprise both short-term signal-to-noise estimates and long-term signal-to-noise estimates.

4. The method of claim 1 further comprising the step of determining a corresponding power estimate for each of said plurality of incoming audio channel signals, and wherein said step of selecting said proper subset of said plurality of incoming audio channel signals is further based on said corresponding plurality of power estimates.

5. The method of claim 4 wherein said power estimates comprise both instantaneous energy estimates and long-term average energy estimates.

6. The method of claim 1 further comprising the step of applying voice activity detection to each of said plurality of incoming audio channel signals to determine whether each of said plurality of incoming audio channel signals comprises speech, and wherein said step of selecting said proper subset of said plurality of incoming audio channel signals is further based on said determination of whether each of said plurality of incoming audio channel signals comprises speech.

7. The method of claim 1 wherein said step of selecting the proper subset of said plurality of incoming audio channel signals is further based on a priori predetermined knowledge.

8. The method of claim 7 wherein said a priori predetermined knowledge comprises an indication that one or more of said plurality of incoming audio channel signals is to always be included in said selected proper subset of said plurality of incoming audio channel signals.

9. The method of claim 1 further comprising the step of preprocessing each of said plurality of incoming audio channel signals to produce corresponding preprocessed incoming audio channel signals, and wherein said step of generating said mixed audio channel signal comprises combining said preprocessed incoming audio channel signals corresponding to only said selected proper subset of said incoming audio channel signals.

10. The method of claim 9 wherein said step of preprocessing each of said plurality of incoming audio channel signals comprises performing automatic gain control on each of said plurality of incoming audio channel signals such that each of said preprocessed incoming audio channel signals has a similar volume level.

11. The method of claim 9 wherein said step of preprocessing each of said plurality of incoming audio channel signals comprises performing silence suppression on each of said plurality of incoming audio channel signals to attenuate noise levels in an absence of speech.

12. The method of claim 9 wherein said step of preprocessing each of said plurality of incoming audio channel signals comprises performing noise reduction on each of said plurality of incoming audio channel signals.

13. The method of claim 9 wherein said step of preprocessing each of said plurality of incoming audio channel signals comprises performing speech enhancement on each of said plurality of incoming audio channel signals.

14. An apparatus for generating a mixed audio channel signal from a plurality of incoming audio Channel signals, the apparatus comprising:
  a plurality of signal-to-noise ratio estimators which determine a corresponding signal-to-noise ratio estimate for each of said plurality of incoming audio channel signals;
  a mixing controller which selects a proper subset of said plurality of incoming audio channel signals based on said corresponding plurality of signal-to-noise ratio estimates;
  a mixing processor which generates the mixed audio channel signal by combining only said selected proper subset of said incoming audio channel signals,
  wherein said proper subset of said plurality of incoming audio channel signals is selected by choosing a plural number of said plurality of incoming audio channel signals having higher signal-to-noise ratio estimates than other ones of said plurality of incoming audio channel signals.

15. The apparatus of claim 14 wherein said incoming audio channel signals comprise voice-over-IP packet-based voice signals.

16. The apparatus of claim 14 wherein said signal-to-noise ratio estimates comprise both short-term signal-to-noise estimates and long-term signal-to-noise estimates.

17. The apparatus of claim 14 further comprising a plurality of power estimators which determine a corresponding power estimate for each of said plurality of incoming audio channel signals, and wherein said mixing controller selects said proper subset of said plurality of incoming audio channel signals further based oh said corresponding plurality of power estimates.

18. The apparatus of claim 17 wherein said power estimates comprise both instantaneous energy estimates and long-term average energy estimates.

19. The apparatus of claim 14 further comprising a plurality of voice activity detectors which are applied to each of said plurality of incoming audio channel signals to determine whether each of said plurality of incoming audio channel signals comprises speech, and wherein said mixing controller selects said proper subset of said plurality of incoming audio channel signals further based on said determination of whether each of said plurality of incoming audio channel signals comprises speech.

20. The apparatus of claim 14 further comprising a plurality of signal preprocessors applied to said plurality of incoming audio channel signals to produce corresponding preprocessed incoming audio channel signals, and wherein said mixing processor combines said preprocessed incoming audio channel signals corresponding to only said selected proper subset of said incoming audio channel signals.

21. The apparatus of claim 20 wherein said signal preprocessors comprise means for applying automatic gain control to said plurality of incoming audio channel signals such that each of said preprocessed incoming audio channel signals has a similar volume level.

22. The apparatus of claim 20 wherein said signal preprocessors comprise means for performing silence suppression on said plurality of incoming audio channel signals to attenuate noise levels in an absence of speech.

23. The apparatus of claim 20 wherein said signal preprocessors comprise means for applying noise reduction on said plurality of incoming audio channel signals.

24. The apparatus of claim 20 wherein said signal preprocessors comprise means for performing speech enhancement on said plurality of incoming audio channel signals.

25. The apparatus of claim 14 wherein said mixing controller selects the proper subset of said plurality of incoming audio channel signals further based on a priori predetermined knowledge.

26. The apparatus of claim 25 wherein said a priori predetermined knowledge comprises an indication that one or more of said plurality of incoming audio channel signals is to always be included in said selected proper subset of said plurality of incoming audio channel signals.

* * * * *